United States Patent
Yeh et al.

(10) Patent No.: US 9,912,843 B2
(45) Date of Patent: Mar. 6, 2018

(54) HDMI RECEIVING CIRCUIT AND METHOD FOR DETERMINING TRANSMISSION MODE

(71) Applicant: MStar Semiconductor, Inc., Hsinchu Hsien (TW)

(72) Inventors: Chun Wen Yeh, Hsinchu Hsien (TW); Shuo-Ting Kao, Hsinchu Hsien (TW); Te-Chuan Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/424,069

(22) Filed: Feb. 3, 2017

(65) Prior Publication Data

US 2017/0374242 A1     Dec. 28, 2017

(30) Foreign Application Priority Data

Jun. 22, 2016 (TW) .............................. 105119511 A

(51) Int. Cl.
*H04N 5/04* (2006.01)
*H04N 5/44* (2011.01)
*G09G 5/00* (2006.01)

(52) U.S. Cl.
CPC .............. *H04N 5/04* (2013.01); *G09G 5/008* (2013.01); *H04N 5/44* (2013.01); *G09G 2370/12* (2013.01)

(58) Field of Classification Search
CPC ............ H04N 5/04; H04N 5/44; H04N 5/126; H04N 5/123; H04N 5/12; H04N 21/43635; G09G 5/008; G09G 2370/12

USPC ....... 348/725, 537, 536, 540, 542, 547, 545; 375/316, 327, 344, 354–356, 376, 373

IPC ................................................ H04N 5/44,5/04

See application file for complete search history.

(56) References Cited

U.S. PATENT DOCUMENTS

| | | | |
|---|---|---|---|
| 9,059,833 B2 * | 6/2015 | Wang ...................... | H04L 7/033 |
| 2010/0066919 A1 * | 3/2010 | Nakajima ............... | H04B 1/205 |
| | | | 348/725 |
| 2010/0135429 A1 * | 6/2010 | Nakajima ................ | H04N 5/63 |
| | | | 375/295 |

FOREIGN PATENT DOCUMENTS

TW             201515470 A      4/2015

* cited by examiner

*Primary Examiner* — Sherrie Hsia
(74) *Attorney, Agent, or Firm* — Edell, Shapiro & Finnan, LLC

(57) ABSTRACT

A High-Definition Multimedia Interface (HDMI) receiving circuit receives an image signal and an input clock transmitted via HDMI and generates output data. The HDMI receiving circuit includes: a sampling circuit, sampling the image signal according to a transmission mode and the input clock to generate the output data; a data comparison circuit, coupled to the sampling circuit, determining whether the output data includes predetermined data to generate a determination result; and a control circuit, coupled to the sampling circuit and the data comparison circuit, determining the transmission mode according to the determination result.

9 Claims, 3 Drawing Sheets

HDMI RECEIVING CIRCUIT AND METHOD FOR DETERMINING TRANSMISSION MODE

This application claims the benefit of Taiwan application Serial No. 105119511, filed Jun. 22, 2016, the subject matter of which is incorporated herein by reference.

BACKGROUND OF THE INVENTION

Field of the Invention

The invention relates in general to High-Definition Multimedia Interface (HDMI), and more particularly to a circuit and method for determining an HDMI signal transmission mode.

Description of the Related Art

Out of many HMDI versions, HDMI 1.4 and HDMI 2.0 are some mainstreams. Data transmitted via HDMI at least includes a clock signal and an image signal. For HDMI 1.4, the frequency of an image signal is 10 times of that of a clock signal, which has a frequency range of 25 MHz to 340 MHz. For HMDI 2.0, the frequency of an image signal is 40 times of that of a clock signal, which has a frequency range of 85 MHz to 150 MHz. That is to say, an HDMI receiver needs to perform a corresponding process according to a current signal transmission mode in order to obtain correct image data. In general, a transmitter may notify a receiver of a current signal transmission mode through a Display Data Channel (DDC) (i.e., transmitted according to the HDMI 1.4 or HDMI 2.0 specification). However, there are some transmitters that do not implement such function, or data errors may occur during the transmission process—these situations cause the receiver to be unable to process data using the correct signal transmission mode, leading to image errors or even no image at all. Therefore, there is a need for a universal and reliable method for determining an HDMI signal transmission mode.

SUMMARY OF THE INVENTION

The invention is directed to a circuit and method for automatically determining a High-Definition Multimedia Interface (HDMI) signal transmission mode to enhance the accuracy of image processing.

The present invention discloses an HDMI receiving circuit, which receives an image signal and an input clock transmitted via HDMI and generates output data. The HDMI receiving circuit includes: a sampling circuit, sampling the image signal according to a transmission mode and the input clock to generate the output data; a data comparison circuit, coupled to the sampling circuit, determining whether the output data includes predetermined data to generate a determination result; and a control circuit, coupled to the sampling circuit and the data comparison circuit, determining the transmission mode according to the determination result.

The present invention further discloses an HDMI receiving circuit, which receives an image signal and an input clock transmitted via HDMI. The HDMI receiving circuit includes: a first sampling circuit, sampling a first component of the image signal according to a first transmission mode and the input clock to generate first output data; a second sampling circuit, sampling a second component of the image signal according to a second transmission mode and the input clock to generate second output data; a first data comparison circuit, coupled to the first sampling circuit, determining whether the first output data includes first predetermined data to generate a first determination result; a second data comparison circuit, coupled to the second sampling circuit, determining whether the second output data includes second predetermined data to generate a second determination result; and a control circuit, coupled to the first sampling circuit, the second sampling circuit, the first data comparison circuit and the second data comparison circuit, determining that both of the first sampling circuit and the second sampling circuit are to sample the subsequently image signal by using the first transmission mode according to the first determination result.

The present invention further discloses a method for determining an HDMI transmission mode. The method is applied to an HDMI receiver, which receives an image signal and an input clock transmitted via HDMI. The method includes: determining whether a frequency of the input clock satisfies a predetermined range to generate a determination result; and determining a transmission mode when the determination result indicates that the frequency of the input clock satisfies the predetermined range.

The present invention further discloses a method for determining an HDMI transmission mode. The method is applied to an HDMI receiver, which receives an image signal and an input clock transmitted via HDMI. The method includes: sampling the image signal according to a transmission mode and the input clock to generate output data; determining whether the output data includes predetermined data to generate a determination result; and determining the transmission mode according to the determination result.

The HDMI receiver and method for determining a transmission mode of the present invention are capable of reliably learning a current HDMI transmission mode. Compared to the prior art, the present invention determines the transmission mode by directly analyzing an image signal, and is thus capable of obtaining a more accurate result.

The above and other aspects of the invention will become better understood with regard to the following detailed description of the preferred but non-limiting embodiments. The following description is made with reference to the accompanying drawings.

DETAILED DESCRIPTION OF THE INVENTION

The disclosure includes a High-Definition Multimedia Interface (HDMI) receiving circuit and a method for determining a transmission mode. In possible implementation, one person skilled in the art may choose equivalent elements or steps to realize the present invention; that is, the implementation of the present invention is not limited to the non-limiting embodiments below.

Figure 1:
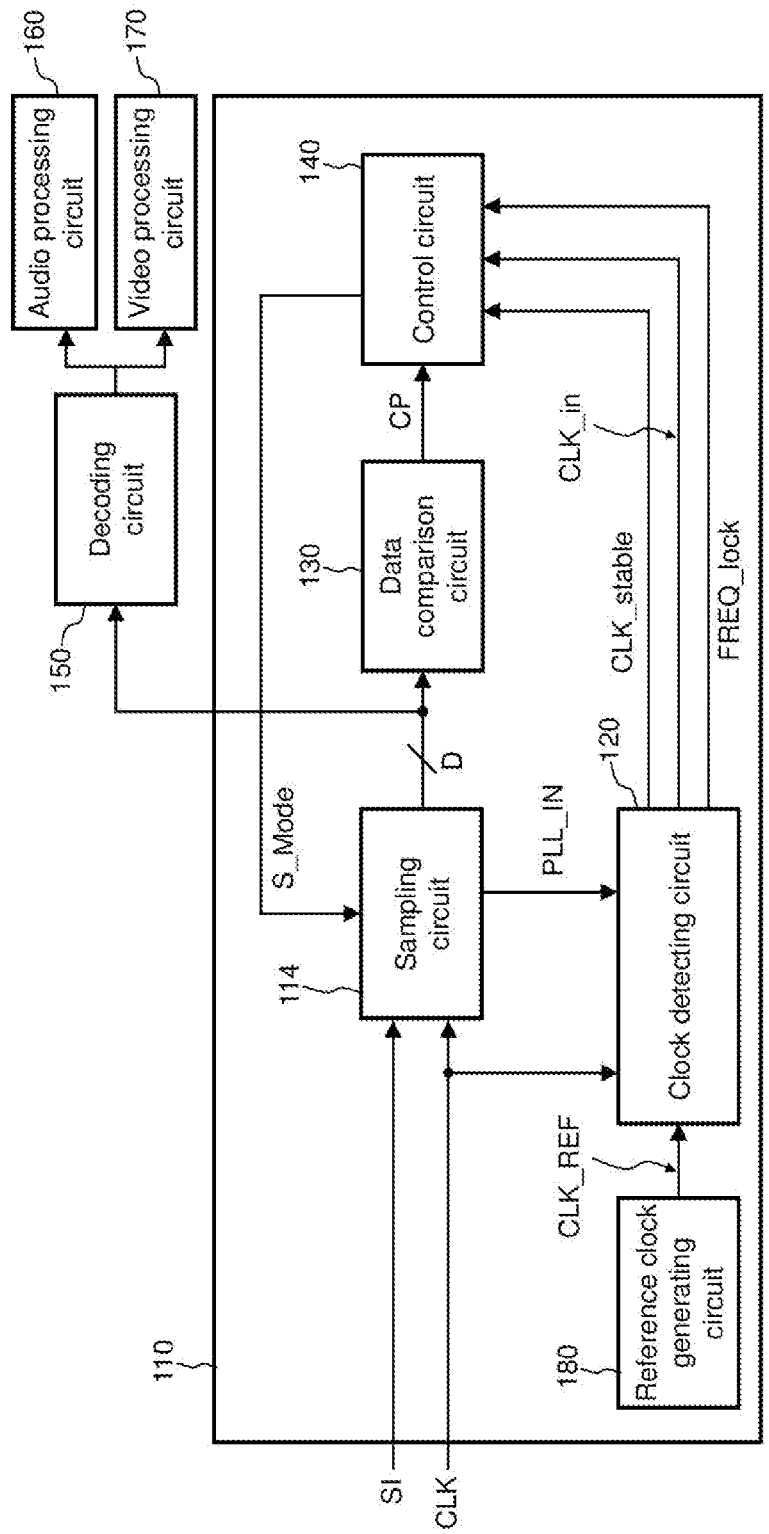
FIG. 1 is a block diagram of a High-Definition Multimedia Interface (HDMI) receiving circuit according to an embodiment of the present invention.

FIG. 1 shows a block diagram of an HDMI receiving circuit according to an embodiment of the present invention. A receiver 110 receives an input signal SI and a clock signal CLK. The input signal SI may include image signals R, G and B, a sound signal and other control signals. The input signal SI and the clock signal CLK are transmitted via HDMI. The receiver 110 includes a sampling circuit 114. The sampling circuit 114 samples the input signal SI according to the clock signal CLK to generate a plurality of sets of output data D. The output data D at least includes image data and other auxiliary data for assisting displaying an image. Through a transmission mode setting value S_Mode, a control circuit 140 controls a parameter that the sampling circuit 114 uses for sampling the input signal SI. A reference clock generating circuit 180 generates a reference clock signal CLK_REF. A clock detecting circuit 120 detects whether the clock signal CLK is stable according to the reference clock signal CLK_REF, and estimates a frequency range of the clock signal CLK. An indication signal PLL_IN is an output signal of a phase-locked loop (PLL) that is in the sampling circuit 114 and multiplies a frequency of the clock signal CLK, and indicates whether the clock signal frequency multiplied by the PLL is stable. A data comparison circuit 130 compares the output data D with predetermined data. The control circuit 140 determines whether the current transmission mode setting value S_Mode is correct according to a detection result of the clock detecting circuit 120 and a comparison result of the data comparison circuit 130. Once the transmission mode is determined, the receiver 110 may then generate the output data D according to the correct transmission mode setting value S_Mode and transmits the output data D to subsequent circuits for further processing, e.g., a decoding circuit 150 (e.g., a transition minimized differential signaling (TMDS) decoding circuit), to decode the output data D. The output data D having been decoded is then forwarded to an audio processing circuit 160 and a video processing circuit 170 to respectively process sound and image parts in the output data D.

Figure 2:
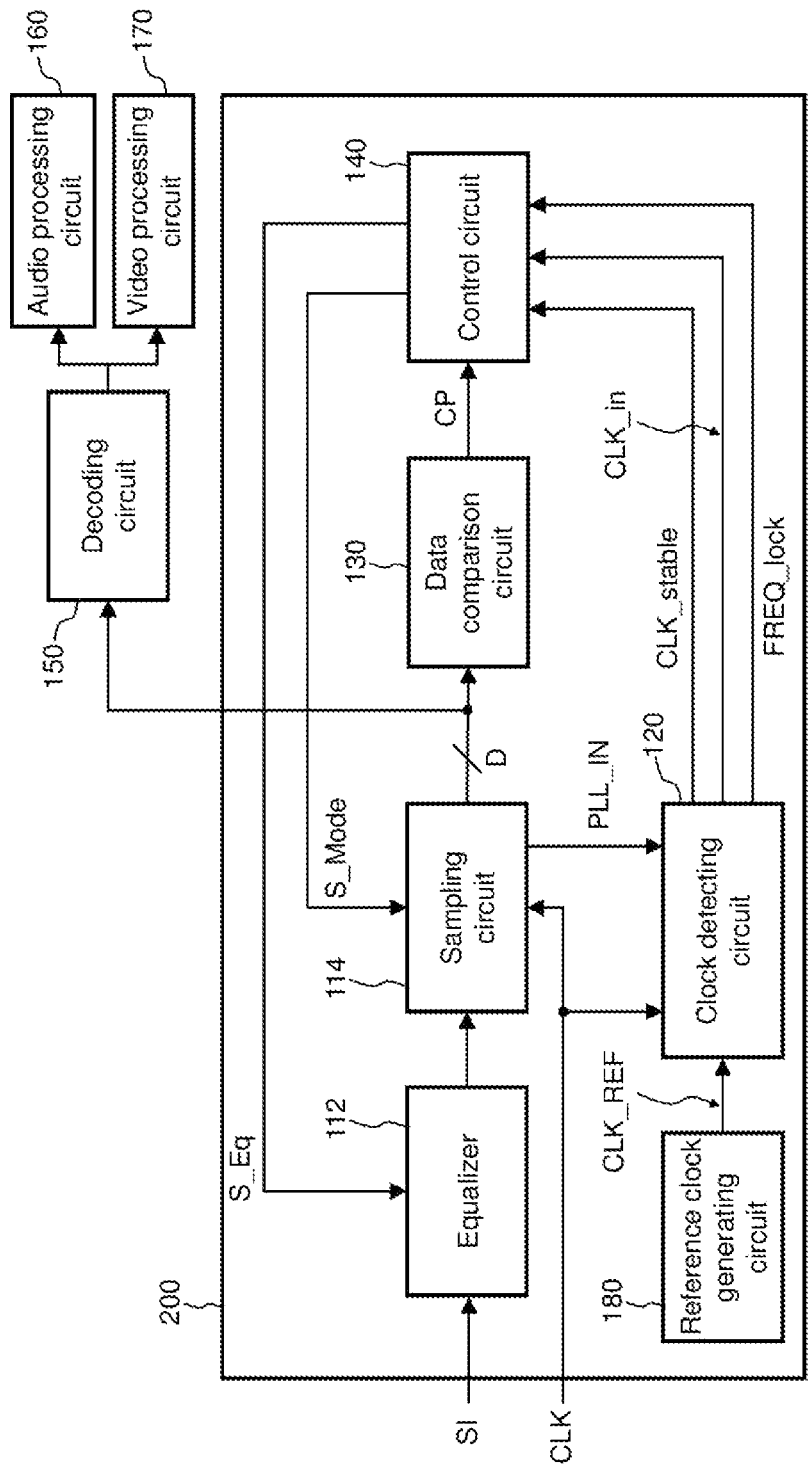
FIG. 2 is a block diagram of an HDMI receiving circuit according to another embodiment of the present invention.

FIG. 2 shows a block diagram of an HDMI receiving circuit according to another embodiment of the present invention. A receiver 200 receives an input signal SI and a clock signal CLK. The input signal SI may include image signals R, G and B, a sound signal and other control signals. The input signal SI and the clock signal CLK are transmitted via HDMI. The receiver 200 includes an equalizer 112 and a sampling circuit 114. The equalizer 112 adjusts the input signal SI to reduce errors generated during a transmission process, e.g., adjusting an image signal in the input signal to generate an adjusted image signal, and/or adjusting a sound signal in the input signal to generate an adjusted sound signal. The sampling circuit 114 samples the input signal SI according to the clock signal CLK to generate a plurality of sets of output data D. The output data D at least includes image data and other auxiliary data for assisting displaying an image. The control circuit 140 controls a parameter that the equalizer 112 uses to adjust the input signal SI through an equalizer setting value S_Eq, and controls a parameter that the sampling circuit 114 uses for sampling the input signal SI through a transmission mode setting value S_Mode. A reference clock generating circuit 180 generates a reference clock signal CLK_REF. A clock detecting circuit 120 detects whether the clock signal CLK is stable according to the reference clock signal CLK_REF, and estimates a frequency range of the clock signal CLK. An indication signal PLL_IN is an output signal of a phase-locked loop (PLL) that is in the sampling circuit 114 and multiplies a frequency of the clock signal CLK, and indicates whether the clock signal frequency multiplied by the PLL is stable. A data comparison circuit 130 compares the output data D with predetermined data. The control circuit 140 determines whether the current transmission mode setting value S_Mode is correct according to a detection result of the clock detecting circuit 120 and a comparison result of the data comparison circuit 130. Once the transmission mode is determined, the receiver 200 may then generate the output data D according to the appropriate equalizer setting value S_Eq and the correct transmission mode setting value S_Mode, and transmit the output data D to subsequent circuits for further processing.

Figure 3:
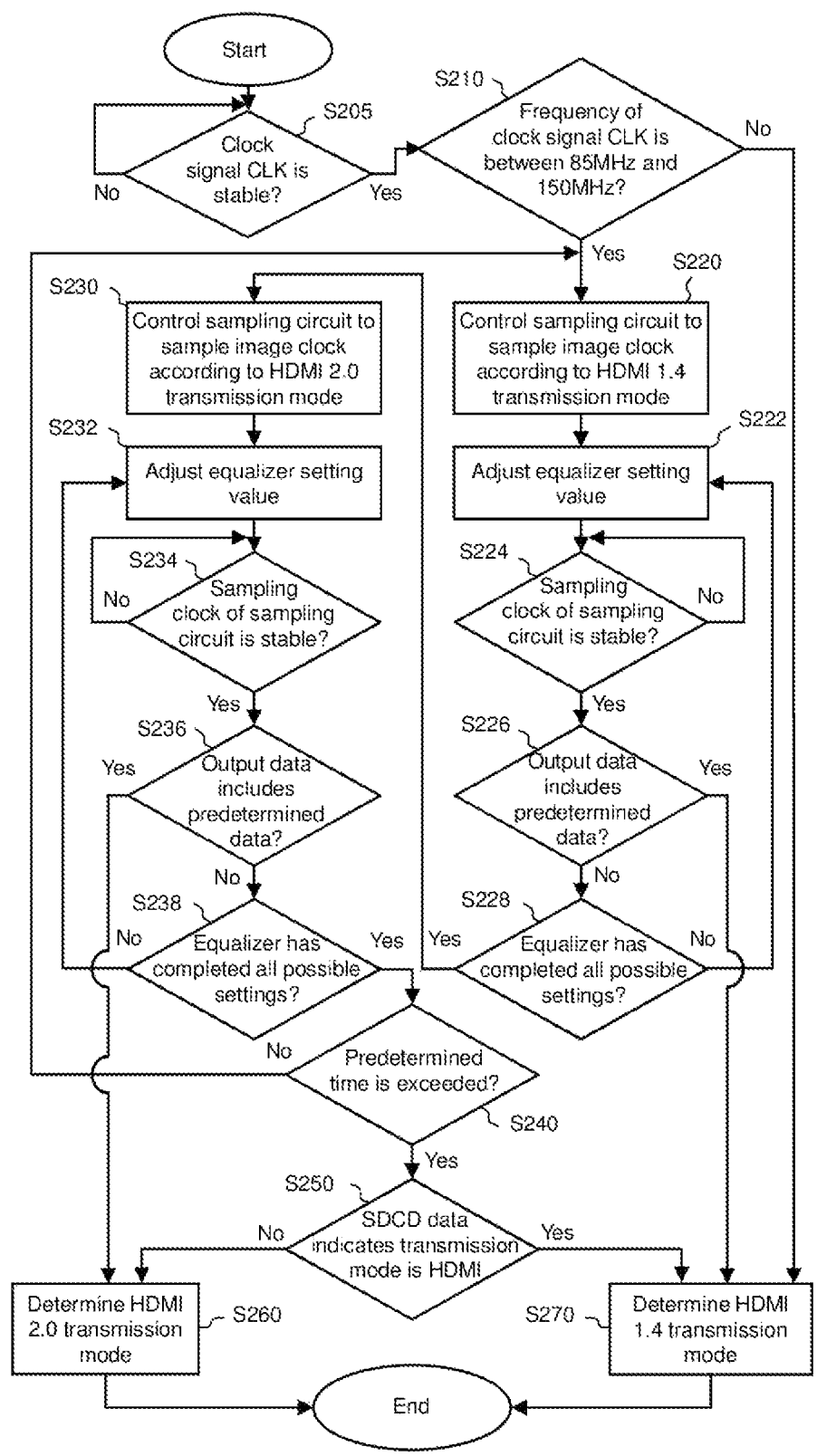
FIG. 3 is a flowchart of a method for determining an HDMI transmission mode according to an embodiment of the present invention.

FIG. 3 shows a flowchart of a method for determining HDMI transmission mode according to an embodiment of the present invention. The determination process and detailed operations of the circuits in FIG. 1 are described below with reference to the flowchart in FIG. 3. The receiver 110 of the HDMI receiving circuit first receives the input signal SI, which includes a clock signal and an image signal, and the clock detecting circuit 120 determines whether the clock signal CLK is stable (step S205). When it is determined that the clock signal CLK is stable, the clock detecting circuit 120 determines whether the frequency of the clock signal CLK is between 85 MHz and 150 MHz (step S210). In step S205, by setting a determination interval (e.g., a multiple of a cycle of the reference clock signal CLK_REF) according to the reference clock signal CLK_REF (with a known frequency) generated by the reference clock generating circuit 180, the clock detecting circuit 120 determines whether the clock signal CLK is stable. More specifically, during the determination interval, the clock detecting circuit 120 counts the number of clock cycles of the clock signal CLK using a counter (not shown). When a variance or a level of variance of counter values successively detected is smaller than a predetermined value (e.g., 1%), the clock detecting circuit 120 determines that the clock signal CLK is stable. The clock detecting circuit 120 transmits a control signal CLK stable to the control circuit 140 to indicate whether the clock signal CLK is stable. In step S210, the clock detecting circuit 120 determines the frequency of the clock signal CLK according to the number of clock cycles of the reference clock signal CLK_REF and the number of clock cycles of the clock signal CLK in a predetermined period, and determines whether the frequency of the clock signal CLK is between 85 MHz and 150 MHz. The clock detecting circuit 120 further transmits a control signal CLK in to the control signal 140 to indicate whether the frequency of the clock signal CLK is between 85 MHz and 150 MHz.

When the control signal CLK in indicates that the frequency of the clock signal CLK is not between 85 MHz and 150 MHz, the control circuit 140 determines that the HDMI receiving circuit uses HDMI 1.4 to process the image signal according to the control signal CLK in (step S270).

When the control signal CLK in indicates that the frequency of the clock signal CLK is between 85 MHz and 150 MHz, the control circuit 140, through the transmission mode setting value S_Mode, controls the sampling circuit 114 to sample the image signal according to a parameter corresponding to HDMI 1.4 (step S220), and, through the equalizer setting value S_Eq, controls the equalizer 112 to adjust the image signal (step S222).

In step S220, the PLL in the sampling circuit 114 multiples the frequency of the clock signal CLK by 10 times to generate a sampling clock, according to which the image signal is sampled to generate the above output data D. Step S220 and step S222 may be exchanged or performed simultaneously. In step S224, the clock detecting circuit 120 may determine whether a stable state is reached according to the indication signal PLL_IN, i.e., determining whether the PLL in the sampling circuit 114 is locked. In this embodiment, the sampling clock may be directly used as the indication signal PLL_IN for the clock detecting circuit 120 to determine whether the PLL in the sampling circuit 114 is locked. For example, the determination may be performed by comparing the indication signal PLL_IN with the clock signal CLK, or comparing the indication signal PLL_IN with the reference clock signal CLK_REF. In another embodiment, the indication signal PLL_IN may be a feedback signal of the PLL, and directly indicates whether the PLL in the sampling circuit 114 is locked. When the sampling clock of the sampling circuit 114 is stable (i.e., the indication signal PLL_IN is stable) and the determination result of step S224 is affirmative, the clock detecting circuit 120 notifies the control circuit 140 by using a control signal FREQ_lock. Next, in step S226, the comparison circuit 130 determines whether the output data D includes the predetermined data, and notifies the control circuit 140 of the comparison result through a control signal CP. It should be noted that, in practice, during the process in which the data comparison circuit 130 waits for the sampling clock to reach a stable state in step S224, the data comparison circuit 130 starts to continually compare the output data D with the predetermined data. Once the output data D includes the predetermined data, the data comparison circuit 130 immediately notifies the control circuit 140 of the comparison result through the control signal CP. However, the control circuit 140 inspects the control signal CP only when the sampling clock is stable.

In one embodiment of the present invention, the predetermined data is data in the HDMI specifications that helps the image data to align, e.g., scrambled character vector (SCV) including horizontal synchronization information (Hsync) and vertical synchronization information (Vsycn) and/or control code. Input signals respectively transmitted according to HDMI 1.4 and HDMI 2.0 include different respective control codes, whereas the SCV exists in only the input signal transmitted according to HDMI 2.0. Both of the control code and the SCV include a plurality of sets of predetermined data contents. For example, the control code includes four types of predetermined data contents, and the SCV includes 32 types of predetermined data contents. When the clock signal CLK and the image signal are transmitted according to the HDMI 1.4 transmission mode, and the sampling circuit 114 samples the image signal according to the HDMI 1.4 transmission mode, the data comparison circuit 130 is highly probable of identifying that the output data D includes an HDMI 1.4 control code through the comparison process. When the clock signal CLK and the image signal are transmitted by the HDMI 2.0 transmission mode, and the sampling circuit 114 samples the image data according to the HDMI 2.0 transmission mode, the data comparison circuit 130 is highly probable of identifying that the output data D includes an HDMI 2.0 control code or SCV through comparison process. Conversely, if the sampling circuit 114 samples according to the incorrect transmission mode, the output data D is inevitably incorrect, and the control signal CP of the data comparison circuit 130 naturally indicates that the output data D does not include the predetermined data. Due to periodic occurrence of the predetermined data, in one embodiment of the present invention, the control signal CP may be set to indicate that the output data D includes the predetermined data when the number of times of the predetermined data occurring within a unit time or a ratio of the predetermined data occupies in the output data D exceeds a threshold, so as to enhance the accuracy of data comparison. It should be noted that, the SCV or control code is one implementation method of the present invention, and other data corresponding to different transmission modes and having different data types in HDMI may also serve as the predetermined data in the present invention.

In the embodiment, assuming that the predetermined data is a control code of an input signal transmitted according to the HDMI 1.4 transmission mode, when the control signal CP indicates that the output data D includes the predetermined data (e.g., the determination of step S226 is affirmative), i.e., that sampling circuit 114 currently samples according to the correct transmission mode, the control circuit 140 at this point may determine that the current transmission mode is HDMI 1.4 (step S270). However, when the determination of step S226 is negative, one possible reason is that the equalizer 112 has not yet adjusted the equalizer setting value S_Eq to an ideal value in a way that the output data D is not accurate enough. The control circuit 140 then determines whether all possible settings of the equalizer 112 are completed (step S228), e.g., determining whether the predetermined equalizer setting values are completely used. When there are equalizer setting values the equalizer 112 has not yet attempted in the HDMI 1.4 transmission mode, the control circuit 140 continues adjusting the equalizer 112 according to other equalizer setting values S_Eq (returning to step S222). When the predetermined equalizer setting values S_Eq are completely used, the control circuit 140 controls the sampling circuit 114 change to sample the image signal according to the parameter corresponding to the HDMI 2.0 transmission mode through the transmission mode setting value S_Mode (step S230). Subsequent steps S232 to S238 are identical or similar to steps S222 to S228, and shall be omitted herein. When the determination of step S238 is affirmative, i.e., the control circuit 140 is unable to determine the transmission mode after all predetermined equalizer setting values S_Eq are completely used in the HDMI 1.4 and HDMI 2.0 transmission modes, the control circuit 140 at this point determines whether the current process exceeds a predetermined time (step S240). When the current process does not exceed the predetermined time, steps S220 to S228 are iterated (not necessarily all performed, e.g., interrupted when the determination of step S226 or step S236 is affirmative). When the current process exceeds the predetermined time, the control circuit 140 changes to determine based on status and control data channel (SCDC) transmitted via HDMI (step S250).

In one embodiment, the equalizer 112, the sampling circuit 114, the clock detecting circuit 120, the data comparison circuit 130, the control circuit 140 and the reference clock generating circuit 180 are all implemented by hardware. For example, the clock detecting circuit 120 includes a counter, the data comparison circuit 130 includes a comparator, the control circuit 140 includes a logic circuit and a flip-flop and completes the above logic determinations in form of a finite machine, and the reference clock generating clock circuit 180 is an element capable of generating a stable clock signal, e.g., an inductance and capacitance tank (LC tank). Further, because any of the R, G and B image signals transmits the foregoing predetermined data, the data comparison circuit 130 needs to compared only one set of the output data D.

In an alternative embodiment of the present invention, the HDMI receiving circuit may perform detection simultaneously using the HDMI 1.4 and HDMI 2.0 transmission modes. That is to say, steps S220 to S228 and steps S230 to S238 in the flowchart in FIG. 3 may be simultaneously performed, so as to save the time needed for determining the transmission mode. In this embodiment, the control circuit 140 may set the sampling circuit 114 simultaneously using different transmission mode setting values S_Mode. Thus, one set of sub-sampling circuit (not shown) in the sampling circuit 114 is caused to sample a first image signal (e.g., the image signal R) according to the HDMI 1.4 transmission mode, and another set of sub-sampling circuit (not shown) is caused to sample a second image signal (e.g., the image signal B) according to the HDMI 2.0 transmission mode. Similarly, the data comparison circuit 130 uses two sets of sub-comparison circuits to compare the sample result of the first image signal with the predetermined data of the HDMI 1.4, and the sample result of the second image signal with the predetermined data of the HDMI 2.0. At this point, the control signal CP indicates that the comparison result corresponding to HDMI 1.4 includes first predetermined data (corresponding to a control code of HDMI 1.4) or the comparison result corresponding to HDMI 2.0 includes second predetermined data (a control code or SCV corresponding to HDMI 2.0). When the comparison result corresponding to HDMI 1.4 includes the first predetermined data, the control circuit 140 sets all sampling units of the sampling circuit 114 to process the image signal according to the HDMI 1.4 transmission mode. Conversely, when the comparison result corresponding to HDMI 2.0 includes the second predetermined data, the control circuit 140 sets all sampling units of the sampling circuit 114 to process the image signal according to the HDMI 2.0 transmission mode. For the control circuit 140, only logic circuits of the finite machine corresponding to a situation where steps S220 to S228 and steps S230 to S238 are simultaneously performed need to be modified.

In another embodiment of the present invention, steps S230 to S238 in the flowchart in FIG. 3 may be first performed, and steps S220 to S228 may then be performed. That is, whether the current transmission mode is HDMI 2.0 is first performed, and whether the current transmission mode is HDMI 1.4 is then performed if not.

One person skilled in the art may understand implementation details and variations of the method in FIG. 3 based on the disclosure of the device in FIG. 1 and FIG. 2. While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A High-Definition Multimedia Interface (HDMI) receiving circuit, receiving an image signal and an input clock transmitted via HDMI and generating output data, comprising:
   a sampling circuit, sampling the image signal according to a transmission mode and the input clock to generate the output data;
   a data comparison circuit, coupled to the sampling circuit, determining whether the output data comprises predetermined data to generate a determination result; and
   a control circuit, coupled to the data comparison circuit, determining the transmission mode according to the determination result,
   wherein the predetermined data comprises one of vertical synchronization information and horizontal synchronization information.

2. The HDMI receiving circuit according to claim 1, further comprising:
   a clock detecting circuit, coupled to the control circuit, determining whether a frequency of the input clock satisfies a predetermined range.

3. The HDMI receiving circuit according to claim 1, further comprising:
   a clock generating circuit, generating a reference clock; and
   a clock detecting circuit, coupled to the clock generating circuit, determining whether the input clock is stable according to the reference clock.

4. A method for determining a High-Definition Multimedia Interface (HDMI) transmission mode, applied to an HDMI receiver that receives an image signal and an input clock transmitted via HDMI, the method comprising:
   sampling the image signal according to a transmission mode and the input clock to generate output data;
   determining whether the output data comprises predetermined data to generate a determination result; and
   determining the transmission mode according to the determination result,
   wherein the output data comprises a plurality of sets of image data, and the predetermined data comprises one of vertical synchronization information and horizontal synchronization information.

5. The method according to claim 4, further comprising:
   generating a reference clock; and
   determining whether the input clock is stable according to the reference clock.

6. The method according to claim 4, wherein the step of sampling the image signal according to the transmission mode and the input clock to generate the output data comprises:
   multiplying a frequency of the input clock according to the transmission mode to generate a sampling clock; and
   sampling the image signal according to the sampling clock to generate the output data.

7. The method according to claim 6, wherein the step of multiplying the frequency of the input clock according to the transmission mode to generate the sampling clock multiplies the frequency of the input clock by one of ten times and forty times according to the transmission mode to generate the sampling clock.

8. A High-Definition Multimedia Interface (HDMI) receiving circuit, receiving an image signal and an input clock transmitted via HDMI and generating output data, comprising:
   a sampling circuit, sampling the image signal according to a transmission mode and the input clock to generate the output data;
   a data comparison circuit, coupled to the sampling circuit, determining whether the output data comprises predetermined data to generate a determination result; and
   a control circuit, coupled to the data comparison circuit, determining the transmission mode according to the determination result,
   wherein the predetermined data is one of a scrambled character vector (SCV) and a control code.

9. A method for determining a High-Definition Multimedia Interface (HDMI) transmission mode, applied to an HDMI receiver that receives an image signal and an input clock transmitted via HDMI, the method comprising:
   sampling the image signal according to a transmission mode and the input clock to generate output data;

determining whether the output data comprises predetermined data to generate a determination result; and
determining the transmission mode according to the determination result,
wherein the predetermined data is one of a scrambled code vector (SCV) and a control code.

* * * * *